US008254620B2

(12) United States Patent
Li et al.

(10) Patent No.: US 8,254,620 B2
(45) Date of Patent: Aug. 28, 2012

(54) EARPHONE ASSEMBLY AND PORTABLE ELECTRONIC DEVICE USING THE SAME

(75) Inventors: Jian-Hui Li, Shenzhen (CN); Zhi-Xiang Wang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 409 days.

(21) Appl. No.: 12/630,933

(22) Filed: Dec. 4, 2009

(65) Prior Publication Data

US 2011/0026754 A1 Feb. 3, 2011

(30) Foreign Application Priority Data

Jul. 30, 2009 (CN) .......................... 2009 1 0305009

(51) Int. Cl.
*H04R 25/00* (2006.01)
*H04M 1/00* (2006.01)

(52) U.S. Cl. ........ 381/374; 381/370; 381/380; 381/384; 455/569.1; 455/575.1

(58) Field of Classification Search .......... 381/370–384; 455/569.1, 575.1
See application file for complete search history.

(56) References Cited

U.S. PATENT DOCUMENTS

| | | | | |
|---|---|---|---|---|
| 6,199,785 | B1 * | 3/2001 | Paugh | 242/385.4 |
| 2004/0204165 | A1 * | 10/2004 | Huang | 455/569.1 |
| 2004/0229667 | A1 * | 11/2004 | Tsai | 455/575.2 |

* cited by examiner

*Primary Examiner* — Yuwen Pan
*Assistant Examiner* — Matthew Eason
(74) *Attorney, Agent, or Firm* — Altis Law Group, Inc.

(57) ABSTRACT

An earphone assembly includes a casing, at least one secondary cable, at least one earphone, and at least one reel mechanism. The casing includes an assembly chamber. The earphone electrically connects to the casing by the secondary wire. The reel mechanism is received in the assembly chamber, and controls a length of the secondary cable extending from the assembly chamber. A portable electronic device using the earphone assembly is also provided.

12 Claims, 9 Drawing Sheets

EARPHONE ASSEMBLY AND PORTABLE ELECTRONIC DEVICE USING THE SAME

BACKGROUND

1. Technical Field

The present disclosure relates to earphone assemblies and a portable electronic device using the earphone assemblies.

2. Description of Related Art

Electronic devices are widely used for playback of music and other audio or multimedia content. To avoid disturbing others and isolate experience, an earphone or earphones are often utilized. A commonly used earphone includes a main body for insertion in or near the ear and a flexible cable detachably connecting the main body to the device. However, the flexible cable is easily broken, reducing lifetime of the earphone.

Therefore, there is a room for improvement within the art.

BRIEF DESCRIPTION OF THE DRAWINGS

Many aspects of an earphone assembly and portable electronic device using the earphone assembly can be better understood with reference to the following drawings. The components in the drawings are not necessarily to scale, the emphasis instead being placed upon clearly illustrating the principles of the present earphone assembly and portable electronic device using the earphone assembly. Moreover, in the drawings, like reference numerals designate corresponding parts throughout the several views.

DETAILED DESCRIPTION OF THE EMBODIMENTS

Figure 1:
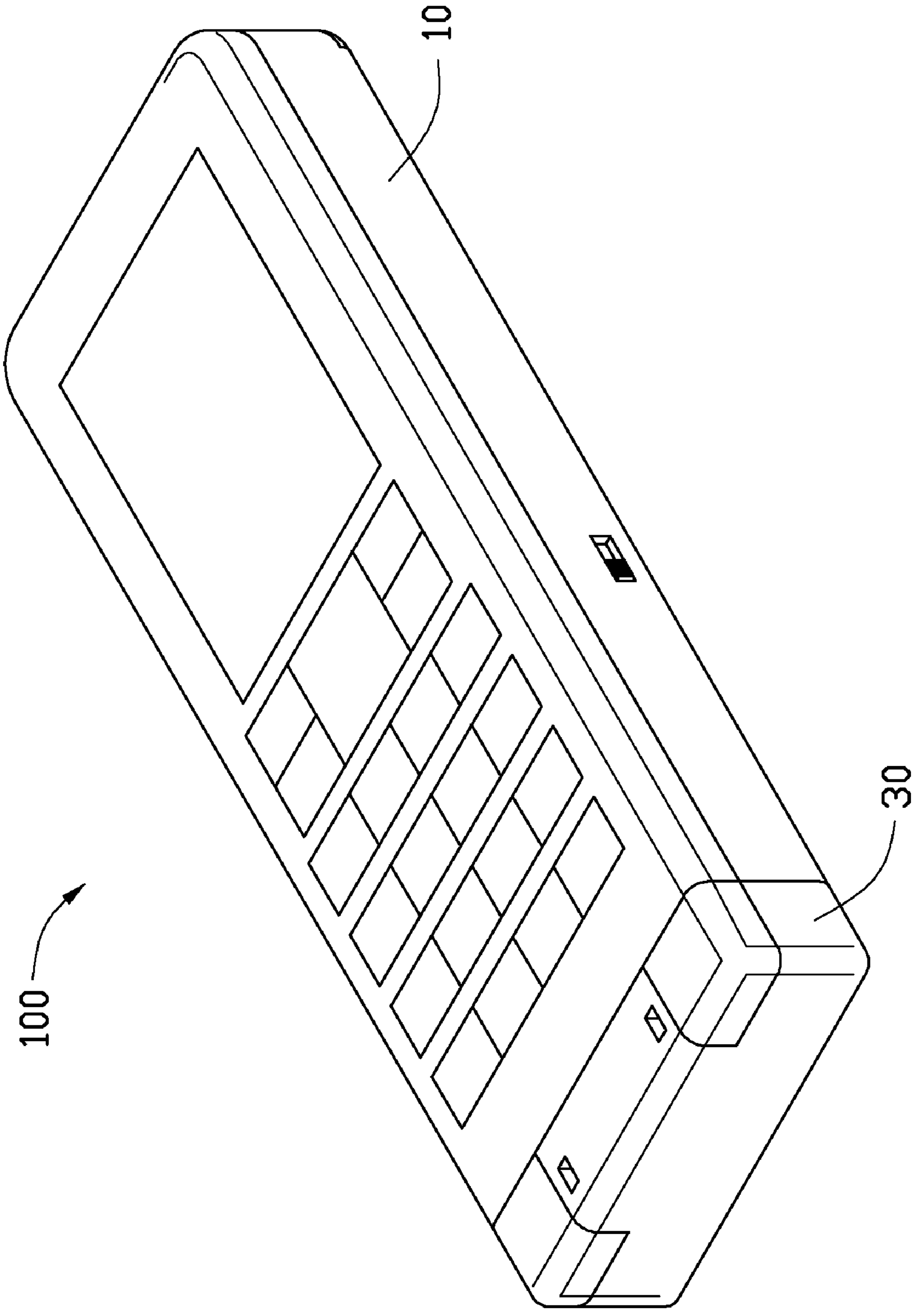
FIG. 1 is an isometric view of a portable electronic device with an earphone assembly according to an exemplary embodiment.
Figure 2:
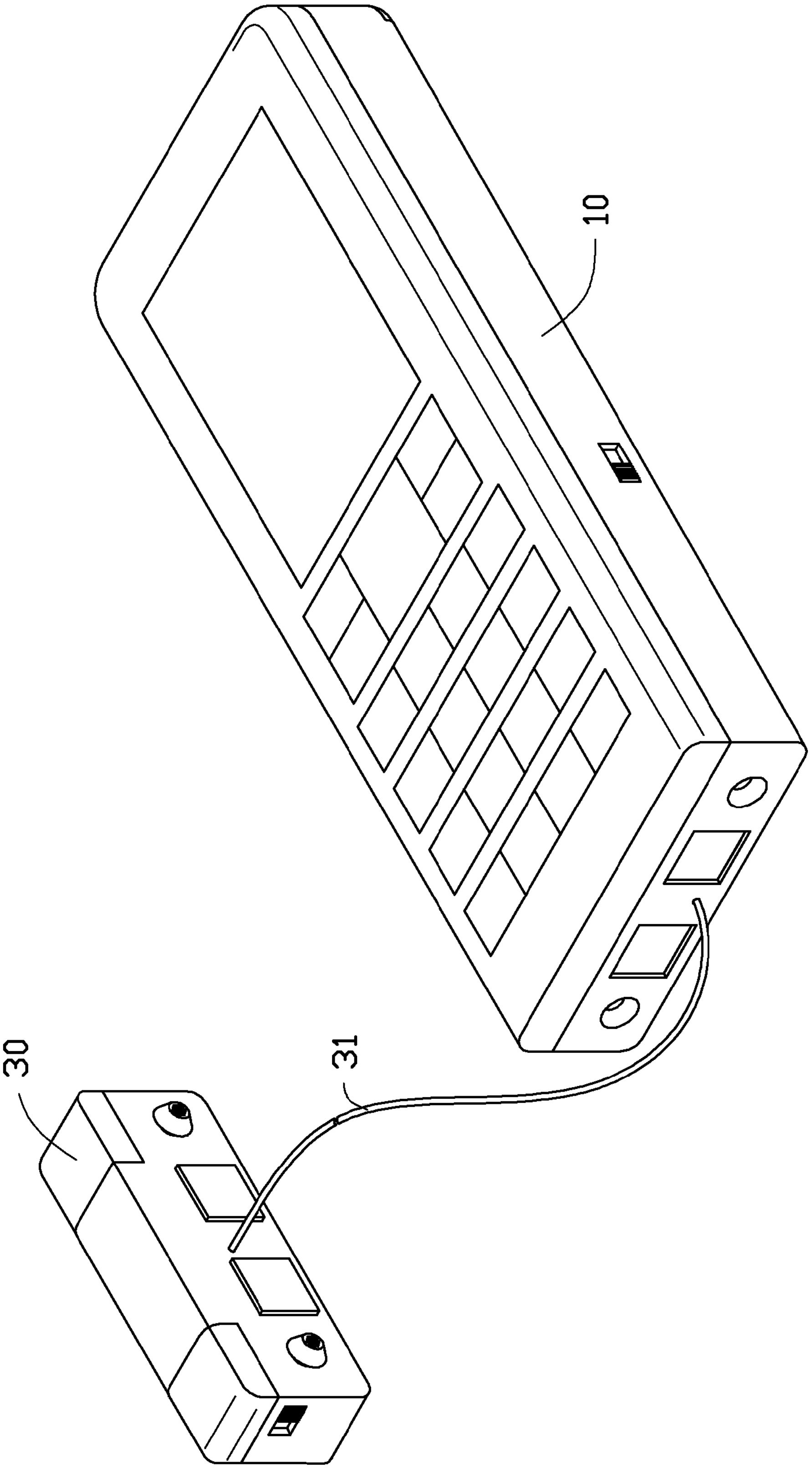
FIG. 2 is an isometric view of an exemplary embodiment of an earphone assembly for use with a portable electronic device, such as, for example, that of FIG. 1.

FIG. 1 and FIG. 2 show an exemplary embodiment of a portable electronic device 100, such as a mobile phone, a personal digital assistant (PDA) or other, including a main body 10 and an earphone assembly 30. The earphone assembly 30 is detachably connected to the main body 10.

Figure 3:
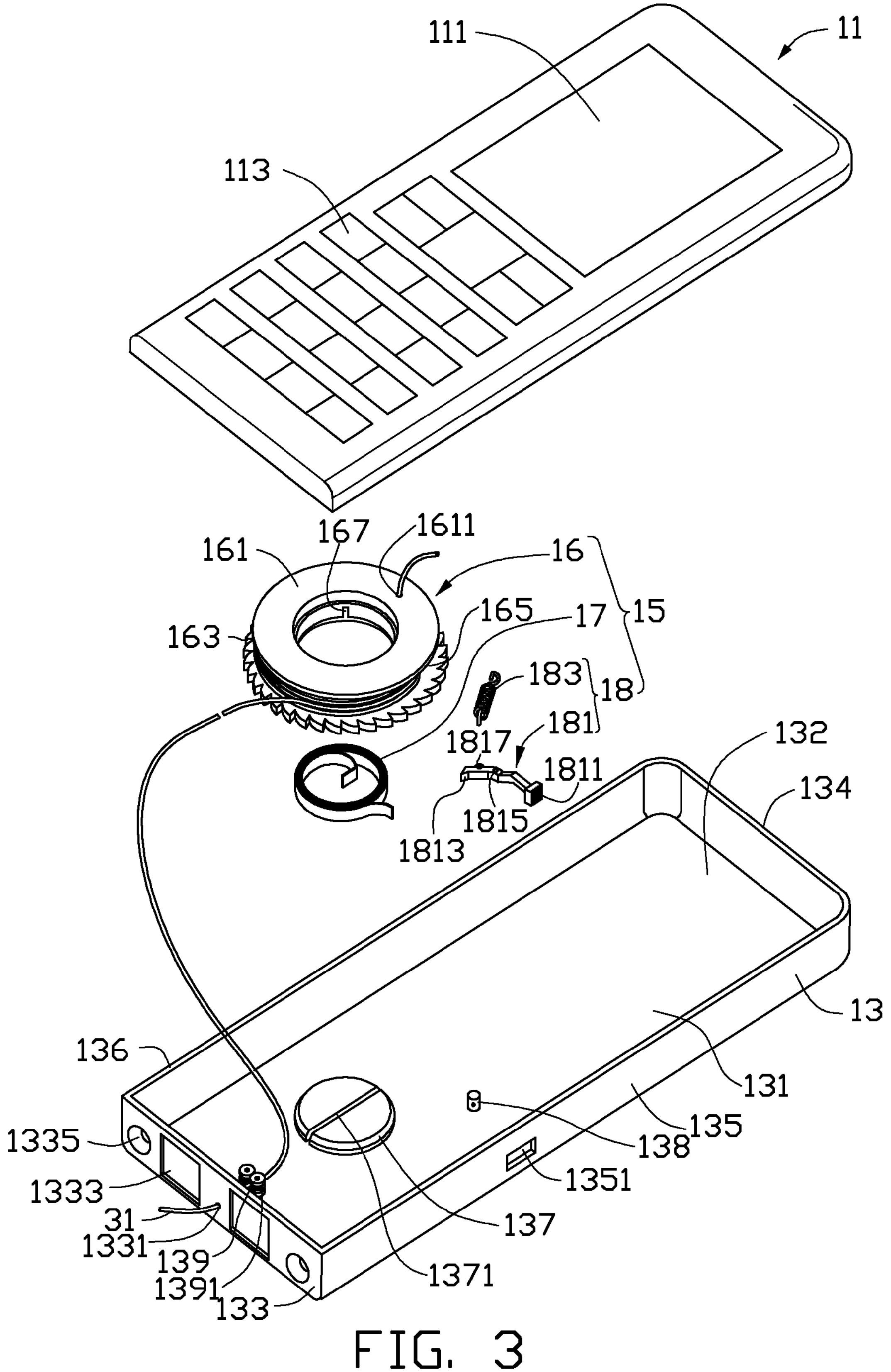
FIG. 3 is an exploded view of the portable electronic device of FIG. 1.

FIG. 3 shows the main body 10 including a cover 11, a housing 13 and a rolling device 15. The cover 11 is detachably connected to the housing 13, and includes a display screen 111 and a keyboard 113. The display screen 111 is configured for showing information of the portable electronic device 100. The keyboard 113 is configured for operating the portable electronic device 100.

The housing 13 includes a bottom wall 132, a first end wall 133, a second end wall 134 opposite to the first end wall 133, a first sidewall 135, and a second sidewall 136 opposite to the first sidewall 135. The bottom wall 132, the first end wall 133, the second end wall 134, the first sidewall 135, and the second sidewall 136 cooperatively define a receiving cavity 131.

A positioning portion 137 and a pin 138 are positioned on the bottom wall 132. Two guiding posts 139 are positioned between the positioning portion 137 and the first end wall 133. A top portion of the positioning portion 137 defines a latching notch 1371. A peripheral wall of each of the guiding posts 139 defines a peripheral groove 1391. The first end wall 133 defines a through hole 1331, two positioning slots 1333, and two assembly holes 1335 disposed in two sides of the through hole 1331. The first end wall 133 and the bottom wall 132 are coated with magnetic material. The first sidewall 135 defines a sliding slot 1351.

Figure 4:
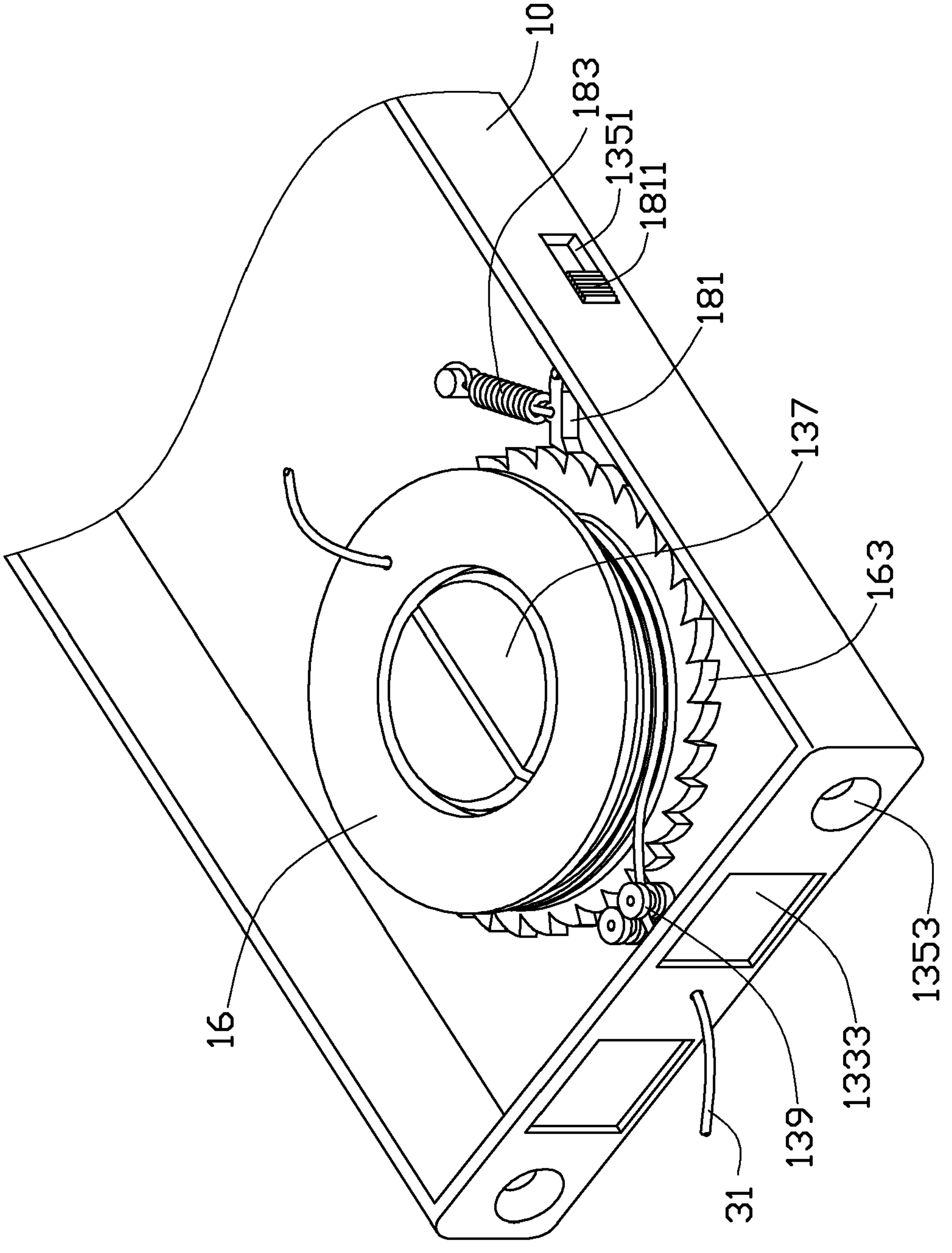
FIG. 4 is a partial assembled view of the portable electronic device of FIG. 3.
Figure 5:
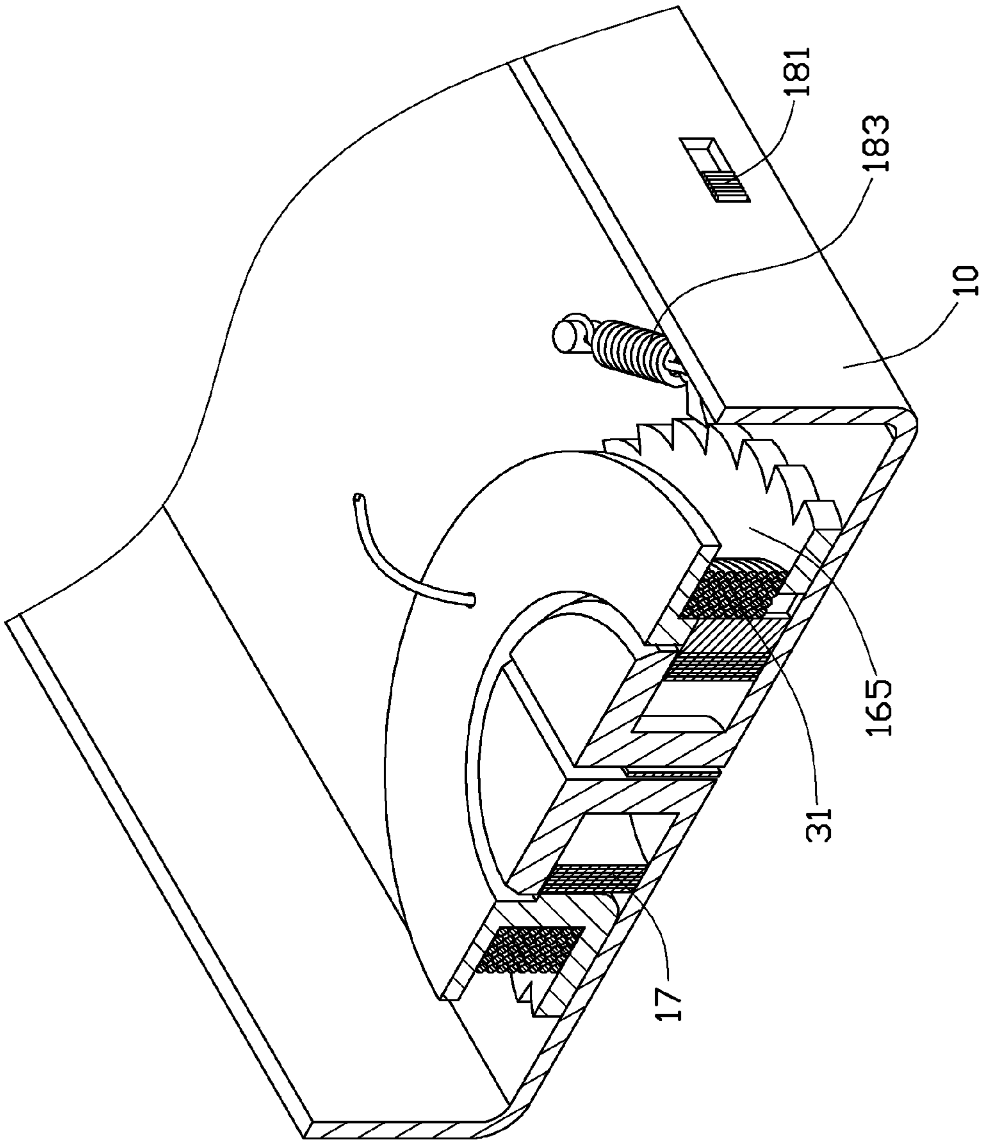
FIG. 5 is a cross-section of the portable electronic device of FIG. 4.

FIG. 4 and FIG. 5 show the rolling device 15 including a rotating element 16, a first spring 17, and a stop mechanism 18. The rotating element 16 is a hollow cylinder rotatable on the positioning portion 137. The rotating element 16 includes a connecting end 161 and a ratchet 163 positioned on an end opposite to the connecting end 161. The connecting end 161 defines an aperture 1611. An outer peripheral wall of the rotating element 16 defines an accommodating space 165 communicating with the aperture 1611. An inner peripheral wall of the rotating element 16 has a latching slot 167 defined therein. One end of the first spring 17 is secured in the latching slot 167, another end is secured in the latching notch 1371. The first spring 17 is configured for providing a restorative force on the rolling device 15.

The stop mechanism 18 includes an operation element 181 and a first elastic element 183. The operation element 181 has an operation portion 1811 and a pawl 1813 respectively positioned on two ends of the operation element 181. The pawl 1813 is configured for matching with the ratchet 163 to form a ratchet mechanism (not labeled). The operation element 181 defines a receiving hole 1815 and a latching hole 1817. One end of the first elastic element 183 is detachably assembled in the latching hole 1817, and another end of first elastic element 183 is detachably connected to the pin 138.

Figure 6:
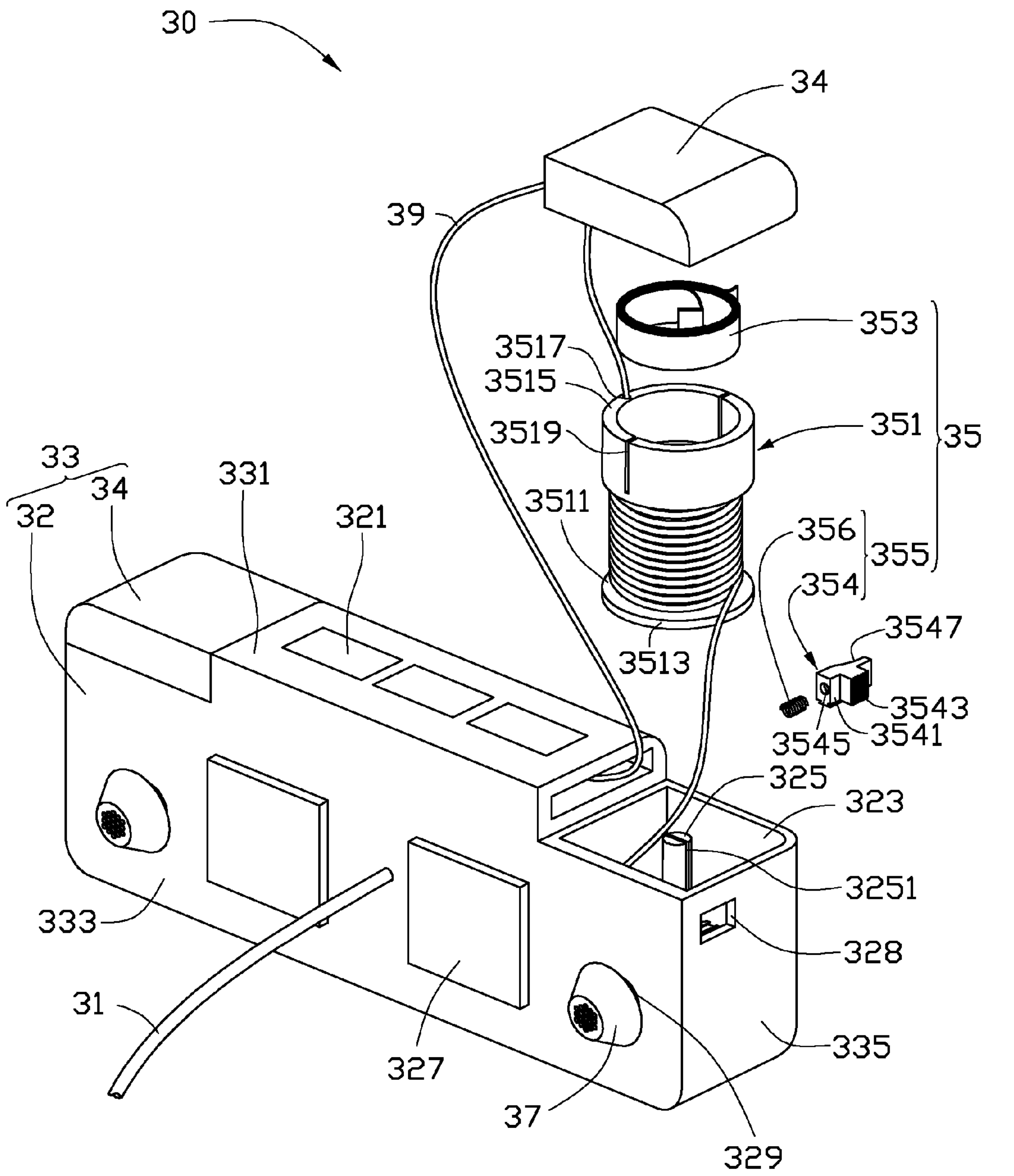
FIG. 6 is an exploded view of the earphone assembly of FIG. 2.
Figure 7:
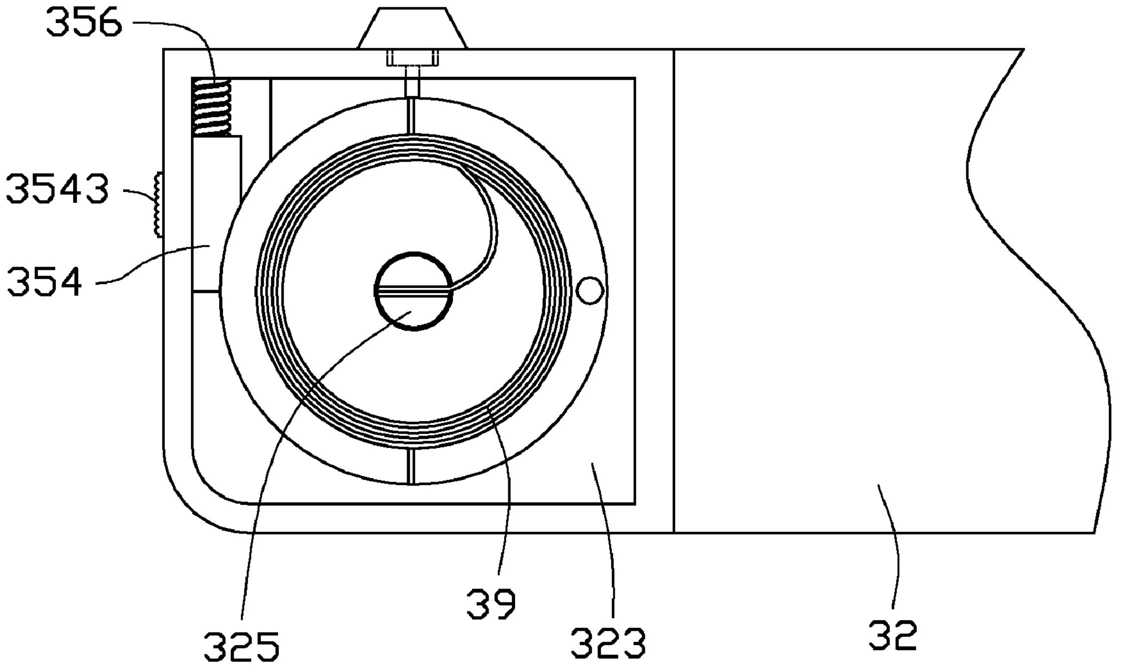
FIG. 7 is a partially assembled view of the earphone assembly of FIG. 6.

FIG. 6 and FIG. 7 show the earphone assembly 30 including a main cable 31, a casing 33, two reel mechanisms 35, two earphones 37, and two secondary wires 39. The main cable 31 electrically connects the earphone assembly 30 to the main body 10. The casing 33 includes an assembly chamber 32 and two seal caps 34. Two first end walls 331, two first sidewalls 333, and two second end walls 335 cooperatively surround the assembly chamber 32. The assembly chamber 32 includes a plurality of controls 321 positioned on an end portion thereof, circuits (not shown) controlled by the controls 321.

The assembly chamber 32 defines two symmetric openings 323 in one of the first end walls 331. Two protrusions 325 are positioned on a bottom of the assembly chamber 32, and are respectively exposed through the openings 323. A free end of each of the protrusions 325 defines a receiving notch 3251. Two magnetic blocks 327 are positioned on one of the first sidewalls 333 adjacent to the first end walls 331. The magnetic blocks 327 can align with the positioning slots 1333 by magnetic attraction. Two earphone holes 329 are symmetrically defined adjacent to the magnetic blocks 327, and configured for receiving the earphones 37. By action of the magnets respectively secured in the earphones 37, the earphones 37 can be attracted into the assembly holes 1335. A guide hole 328 is symmetrically defined in each second end wall 335.

Each of the reel mechanisms 35 includes a rotating seat 351, a second spring 353, and a control mechanism 355. The rotating seat 351 is a hollow cylinder defining a receiving groove 3511 in a peripheral wall thereof. Accordingly, a flange 3513 and a latching portion 3515 are formed at two free ends of the rotating seat 351. The latching portion 3515 defines a through aperture 3517 communicating with the receiving groove 3511. Two latching grooves 3519 are symmetrically defined in a peripheral wall of the latching portion 3515, and configured for lathing the second spring 353.

The control mechanism 355 includes a sliding element 354 and a second elastic element 356. The sliding element 354 is slidably assembled in the guide hole 328. The sliding element 354 includes a main plate 3541 and an extending portion 3543. The main plate 3541 defines a sliding hole 3545 for receiving the second elastic element 356. The main plate 3541 has a recessed stopper surface 3547 defined in a sidewall thereof. The stopper surface 3547 is configured for preventing rotation of the rotating seat 351. The extending portion 3543 extends from the main plate 3541 opposite to the stopper surface 3547.

During assembly, the pawl 1813 passes through the sliding slot 1351. A shaft received in the receiving hole 1815 rotatably secures the operation element 181 on the bottom wall 132. An end of the first elastic element 183 latches the latching hole 1817, and another end of the first elastic element 183 latches the pin 138.

The main cable 31 entwines round the rotating element 16 and is received in the accommodating space 165. One end of the main cable 31 passes through the aperture 1611, and another end passes through the peripheral groove 1391 and the through hole 1331. The main cable 31 extends from the housing 13 and connects to the circuits.

One end of the first spring 17 latches the latching notch 1371. After the first spring 17 is compressed, another end of the first spring 17 is secured on the rotating element 16 rotatably assembled on the positioning portion 137. The pawl aligns with the ratchet 163. The cover 11 is assembled to the housing 13.

Figure 8:
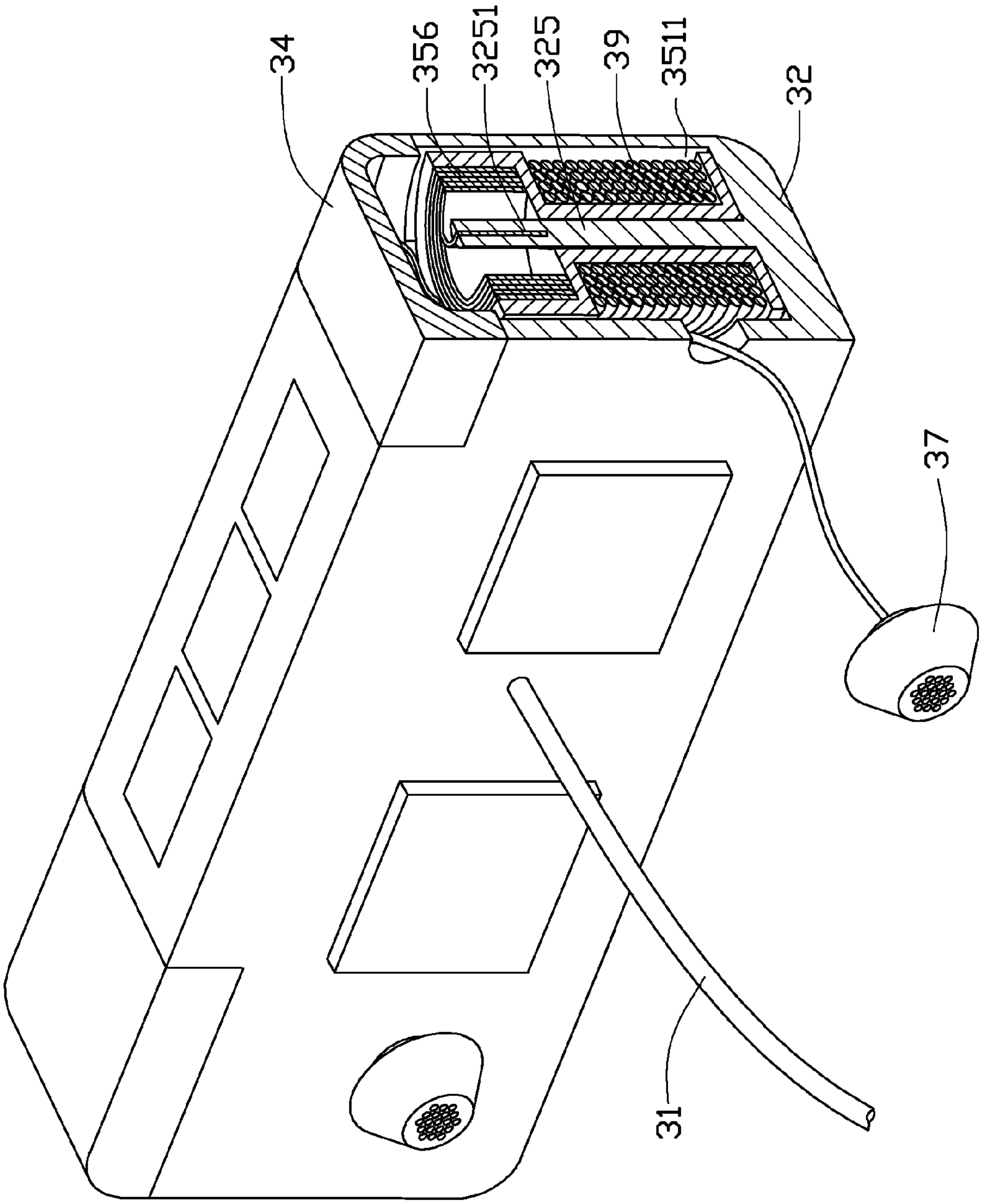
FIG. 8 is an assembled cross-section of the earphone assembly of FIG. 6.

Referring to FIG. 8, the sliding element 354 is slidable in the guide hole 328, and the extending portion 3543 extends from the assembly chamber 32. An end of the second elastic element 356 resists the assembly chamber 32. Another end of the second elastic element 356 is received in the sliding hole 3545 and resists the sliding element 354. The secondary wires 39 respectively pass through the earphone holes 329 and the through aperture 3517 and electrically connect to the circuits. The secondary wires 39 encircle the rotating seat 351 and are received in the receiving groove 3511. An end of the second spring 353 latches the receiving notch 3251. Each rotating seat 351 is rotatably assembled in the assembly chamber 32. After the second spring 353 is compressed, another end of the second spring 353 is secured in the latching grooves 3519. The seal caps 34 cover the corresponding openings 323. The earphones 37 are respectively received in the earphone holes 329. The earphones 37 and the magnetic blocks 327 are respectively drawn into the assembly holes 1335 and the positioning slots 1333 by magnetic function.

Figure 9:
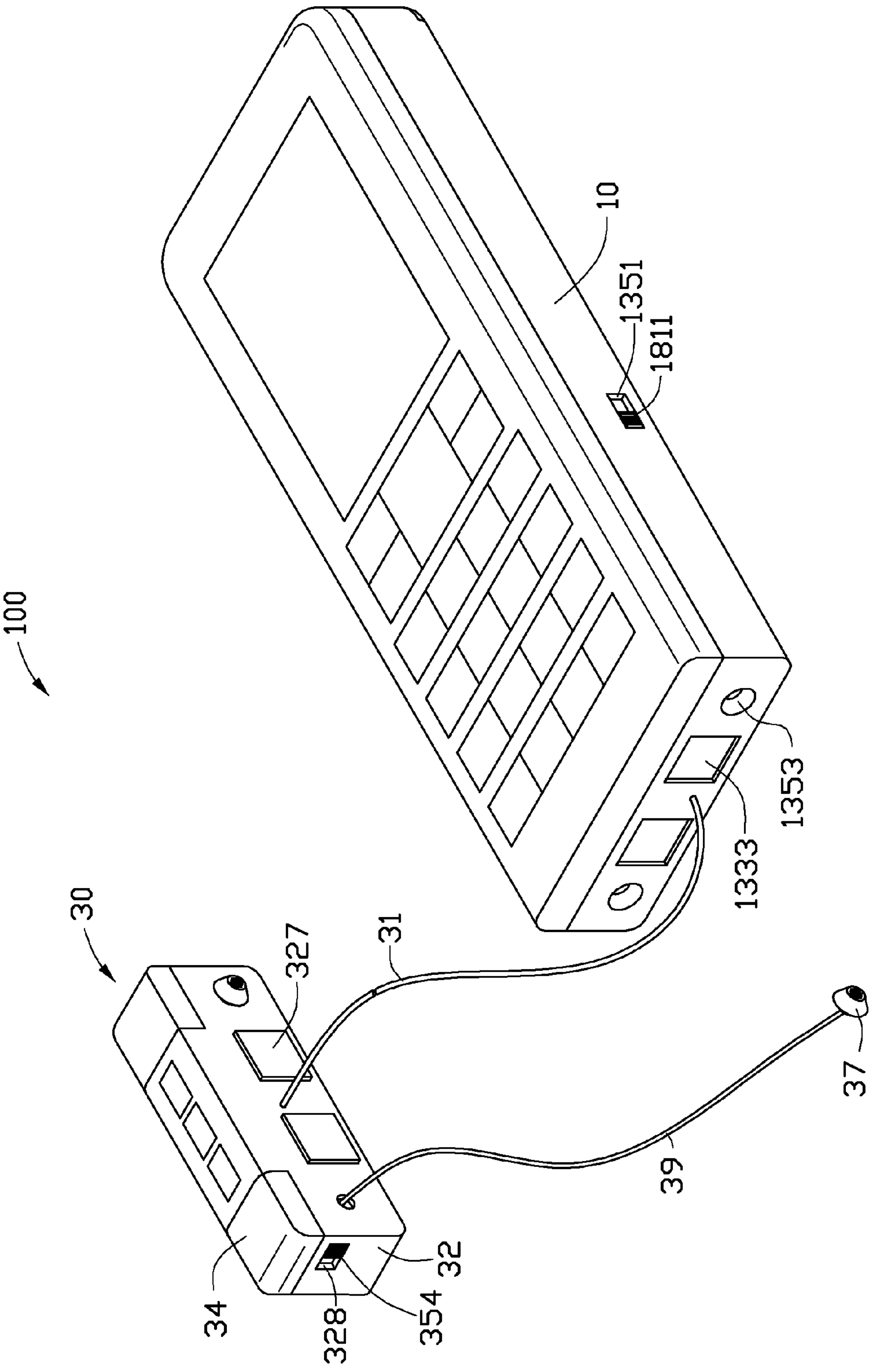
FIG. 9 is an isometric view of the portable electronic device of FIG. 1 in use.

Referring to FIG. 9, during use of the earphone assembly 30, the operation portion 1811 is impelled and the operation element 181 rotates around the shaft. The pawl 1813 is detached from the ratchet 163, thus the rotating element 16 rotates around the positioning portion 137 and compresses the first elastic element 183. The casing 33 is withdrawn from the main body 10. Thus, the magnetic blocks 327 and the earphones 37 are respectively detached from the positioning slots 1333 and the assembly holes 1335. The main cable 31 is pulled out from the main body 10. The operation element 181 is released and the first elastic element 183 returns to an original condition. The ratchet 163 latches the pawl 1813 by the first elastic element 183. The operation element 181 cannot rotate relative to the housing 13 and the earphone assembly 30 is removed from the main body 10.

The sliding elements 354 are impelled and slide in the guide holes 328. The stopper surface 3547 is removed form the second spring 353, thus the second spring 353 rotates relative to the assembly chamber 32 and compresses the second elastic element 356. The earphones 37 are removed from the earphone holes 329. The second spring 353 rotates relative to the assembly chamber 32, and the second spring 353 is compressed. When the secondary wires 39 are pulled out from the assembly chamber 32 to a predetermined length, the sliding elements 354 are released and resist the second spring 353 by second elastic element 356. Thus, the second spring 353 cannot rotate.

The sliding elements 354 are impelled and slide in the guide hole 328. The stopper surface 3547 is removed from the second spring 353, thus the second spring 353 rotates relative to the assembly chamber 32. The secondary wires 39 coil around the rotating seat 351 and are received in the receiving groove 3511 by the second spring 353. Therefore, the secondary wires 39 are received in the assembly chamber 32.

The operation element 181 is impelled and slides in the sliding slot 1351. The pawl 1813 is removed form the ratchet 163, thus the rotating element 16 rotates relative to the housing 13. The main cable 31 coils around the rotating element 16 and is received in the accommodating space 165.

The rolling device 15 and the reel mechanisms 35 can control the length of the main cable 31 and the secondary wires 39 respectively extending from the main body 10 and the assembly chamber 32. Therefore, main cable 31 and the secondary wires 39 may be protected.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device, comprising:

a main body including a housing partially coated by magnetic material;

a main cable;

an earphone assembly electrically connecting to the main body by the main cable; the earphone assembly including a casing, at least one secondary wire, at least one earphone, and at least one reel mechanism; with the earphone electrically connecting to the casing by the secondary wire; the casing including an assembly chamber, and at least one magnetic block positioned on the assembly chamber and aligning with the main body by magnetic function; the reel mechanism received in the assembly chamber, and length of the secondary wire extending from the assembly chamber is controlled.

2. The portable electronic device as claimed in claim 1, further comprising a rolling device comprising a rotating element, a first spring, and a stop mechanism; wherein the main cable coils around the rotating element, the first spring generates elastic force onto the rolling device, and the stop mechanism is configured for controlling the rotating element.

3. The portable electronic device as claimed in claim 1, wherein the rotating element aligns with the stop mechanism to form a ratchet mechanism controlling the rotating element.

4. The portable electronic device as claimed in claim 3, wherein the assembly chamber defines an opening, the reel mechanism includes a rotating seat rotatably assembled in the assembly chamber, a second spring provides an elastic force to the reel mechanism, and a control mechanism is configured for controlling the rotating seat; and wherein an end of the second spring is secured on the assembly chamber and another end of the second spring is secured on the rotating seat.

5. The portable electronic device as claimed in claim 4, wherein the control mechanism includes a sliding element and a second elastic element; the sliding element defines a sliding hole and a stopper surface; an end of the second elastic element resists the assembly chamber, another end of the second elastic element is received in the sliding hole and resists the sliding element; and the stopper surface resists the rotating seat.

6. The portable electronic device as claimed in claim 4, wherein the assembly chamber includes a protrusion positioned on a bottom thereof, respectively exposed by the opening and defining a receiving notch, the rotating seat defines a latching groove; the end of the second spring latches the receiving notch, and another end of the second spring latches the latching groove.

7. The portable electronic device as claimed in claim 1, wherein the housing includes a bottom wall and a first end wall connecting to the bottom wall; the first end wall and the bottom wall are coated by magnetic material; and the at least one magnetic block attracts the first end wall and the bottom wall.

8. The portable electronic device as claimed in claim 7, wherein the stop mechanism includes an operation element and a first elastic element; the housing includes a pin positioned on the bottom wall; one end of the first elastic element is detachably assembled in the operation element, and another end of the first elastic element is detachably connected to the pin.

9. The portable electronic device as claimed in claim 8, wherein the operation element includes an operation portion and a pawl respectively positioned on two ends of the operation element and the pawl aligns with the rotating element.

10. The portable electronic device as claimed in claim 9, wherein the rotating element includes a ratchet with which the pawl aligns.

11. An earphone assembly, comprising:

a casing including an assembly chamber, and at least one magnetic block positioned on the assembly chamber and configured for mounting the casing on a portable electronic device by magnetic attraction;

a main cable electrically connecting to the portable electronic device;

at least one secondary wire;

at least one earphone electrically connecting to the casing by the secondary wire; and at least one reel mechanism received in the assembly chamber, and controlling a length of the secondary wire extending from the assembly chamber.

12. The earphone assembly as claimed in claim 11, wherein the number of the magnetic block is two, the two magnetic blocks are positioned on a sidewall of the casing and configured for aligning with the portable electronic device.

* * * * *